United States Patent [19]
Aine

[11] Patent Number: 4,790,181
[45] Date of Patent: Dec. 13, 1988

[54] THERMAL MASS FLOW METER AND METHOD OF MAKING SAME

[76] Inventor: Harry E. Aine, 30600 Page Mill Rd., Los Altos, Calif. 94022

[21] Appl. No.: 768,857

[22] Filed: Aug. 23, 1985

Related U.S. Application Data

[63] Continuation-in-part of Ser. No. 765,839, Aug. 15, 1985, Pat. No. 4,691,566, and Ser. No. 556,800, Dec. 1, 1983, Pat. No. 4,633,578, said Ser. No. 765,839, is a continuation-in-part of Ser. No. 666,040, Dec. 7, 1984, abandoned.

[51] Int. Cl.$^4$ ............................................... G01F 1/68
[52] U.S. Cl. .................................. 73/204.18; 29/620; 156/662; 73/204.21
[58] Field of Search ........................ 73/204; 29/620; 156/644, 647, 662

[56] References Cited

U.S. PATENT DOCUMENTS

| | | | |
|---|---|---|---|
| 3,931,736 | 1/1976 | Olmstead | 73/204 |
| 4,345,465 | 8/1982 | Gruner et al. | 73/204 |
| 4,373,387 | 2/1983 | Nishimura et al. | 73/204 |
| 4,448,070 | 5/1984 | Ohyama et al. | 73/204 |
| 4,494,406 | 1/1985 | Komons et al. | 73/204 |
| 4,498,337 | 2/1985 | Gruner | 73/204 |
| 4,502,339 | 5/1985 | Horn | 73/204 |
| 4,542,650 | 9/1985 | Renken et al. | 73/204 |
| 4,624,137 | 11/1986 | Johnson et al. | 73/204 |
| 4,627,279 | 12/1986 | Ohta et al. | 73/204 |

FOREIGN PATENT DOCUMENTS

| | | | |
|---|---|---|---|
| 59-147221 | 8/1984 | Japan | 73/204 |
| 60-36916 | 2/1985 | Japan | 73/204 |

*Primary Examiner*—Herbert Goldstein
*Attorney, Agent, or Firm*—Harry E. Aine

[57] ABSTRACT

A thermal mass flow meter includes a comb-shaped structure having a plurality closely spaced septa carried from a common spine and disposed within the flow stream to be measured for partitioning the flow therein into a plurality of generally parallel elongated ribbon-shaped flow stream portions. Temperature-dependent fluid flow sensing resistor means is coupled in heat-exchanging relation predominantly with the narrow face of at least one of said ribbon-shaped flow stream portions for measuring the fluid flow. In a preferred embodiment, the comb-shaped flow partitioning structure is fabricated by anisotropically etching the parallel flow channels through the (110) face of diamond cubic material such as silicon. In another embodiment, a thermal loading member is disposed in heat-exchanging relation with the temperature dependent fluid flow sensing resistor means for thermally loading same and pushing the critical flow rate up to a higher flow to allow operation of the flow sensor in one mode of operation over a wider range of flow rates.

16 Claims, 1 Drawing Sheet

U.S. Patent
Dec. 13, 1988
4,790,181
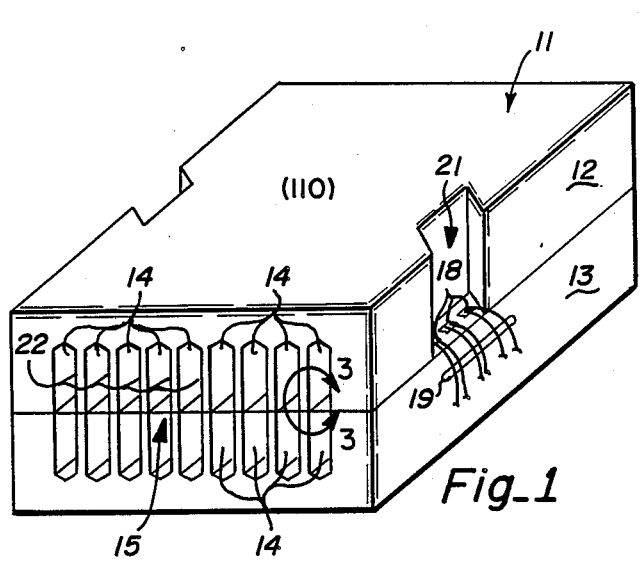
Fig_1
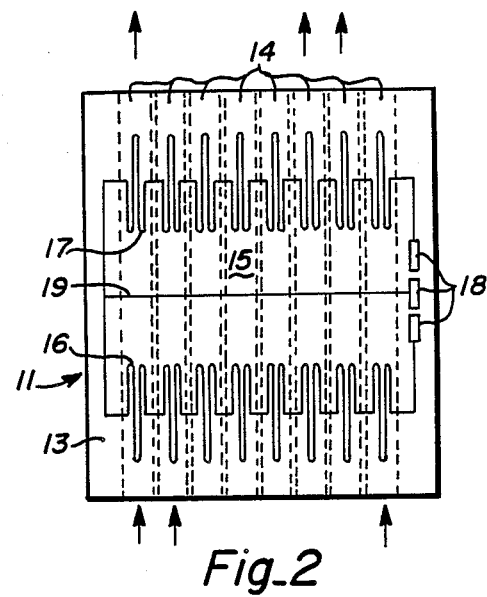
Fig_2
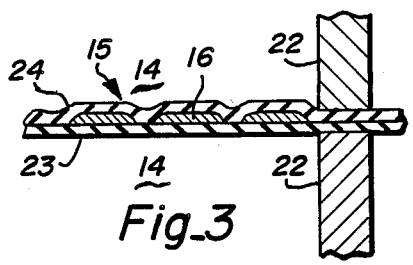
Fig_3
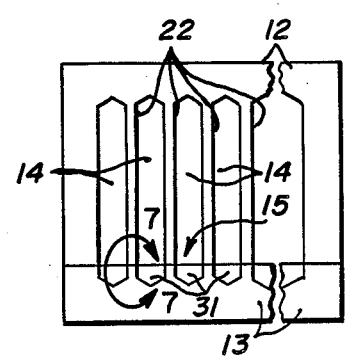
Fig_4
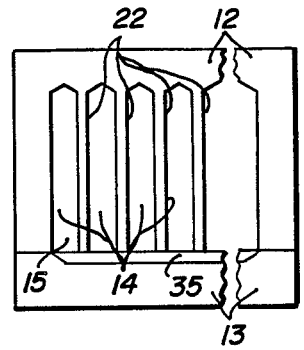
Fig_5
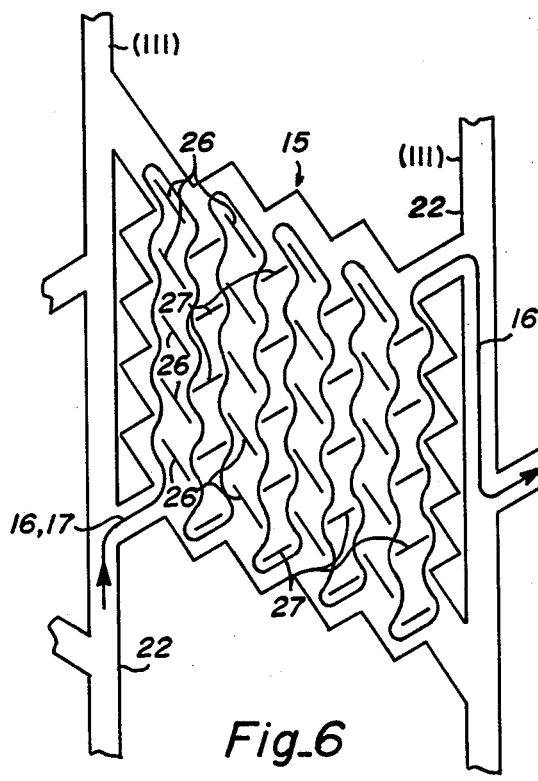
Fig_6
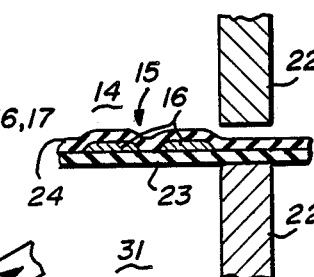
Fig_7
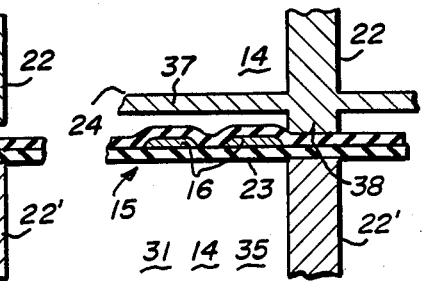
Fig_8
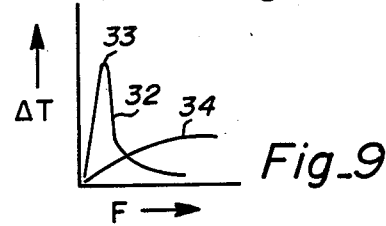
Fig_9

THERMAL MASS FLOW METER AND METHOD OF MAKING SAME

RELATED CASES

The present invention is a continuation-in-part of U.S. patent application Ser. No. 765,839 filed Aug. 15, 1985, now U.S. Pat. No. 4,691,566 which, in-turn, is a continuation-in-part of U.S. Ser. No. 666,040 filed Dec. 7, 1984, now abandoned. The present invention is also a continuation-in-part of U.S. patent application Ser. No. 556,800 filed Dec. 1, 1983, now issued as U.S. Pat. No. 4,633,578 on Jan. 6, 1987.

BACKGROUND OF THE INVENTION

The present invention relates in general to thermal mass flow meters and, more particularly, to such a miniature device readily fabricated by semiconductor processing technology.

DESCRIPTION OF THE PRIOR ART

Heretofore, a thermal mass flow meter has been proposed wherein a semiconductor substrate wafer has been etched to provide a plurality of flow channel portions therein. Webs of electrically insulative and thermally insulative material, such a silicon nitride and silicon dioxide, carrying thereon temperature dependent flow sensing elements bridged across the channels. The webs with the thermal sensing elements carried thereon are in direct contact, i.e., immersed in the fluid flow so as to provide a rapid response. The temperature differential between the sensing resistors, when the device is in operation, is indicative of the thermal mass flow rate. An example of such a thermal mass flow meter is disclosed in European patent application publication No. 137 687 published Apr. 17, 1985, based upon U.S. patent application Ser. No. 526,860 filed Aug. 26, 1983 now U.S. Pat. No. 4,542,650 and U.S. Pat. No. 4,472,239 issued Sept. 18, 1984.

While the aforementioned semiconductive mass flow meters derive a measure of mass flow with a rapid response on the order of milliseconds, the sensing elements sense the mass flow only over a relatively small percentage of the full range of flow rates which it is desired to measure, i.e., 0–10 liters/min. Accordingly, in this prior art device, a flow splitter is employed so that a small fraction of the flow to be measured passes through the thermal flow sensing element and the remainder of the flow passes through a flow splitter. The problem with this kind of an arrangement is that the useful range of the flow measurement is limited because the division of flow between the active flow sensing element and the remaining portion of the flow splitter does not provide uniform splitting of the flow, as a percentage, over a wide range of flow rates. Moreover, clogging of the flow splitter element or of the flow sensing channel can change the flow splitting ratio, thereby producing relatively large erros in the measured flow rate.

Accordingly, it is desirable to provide an improved mass flow meter, preferably of a semiconductor type and of a size commensurate with those of the prior art device, but which directly measure a much greater percentage of the flow to be measured. It is also desirable to provide such an improved device with the capability of measuring the mass flow rate essentially over its entire operating range, in one operating mode, i.e., where the temperature differential between upstream and downstream sensing resistors remains a direct function of flow rate.

SUMMARY OF THE PRESENT INVENTION

The principal object of the present invention is the provision of an improved thermal mass flow meter and method of making same.

In one feature of the present invention, a fluid flow, which is to be measured, is partitioned into a plurality of generally parallel elongated ribbon-shaped flow streams with the thermal flow sensor disposed in heat-exchanging relation predominantly with the narrow face or faces of the partitioned flow stream, whereby rectified flow conditions are maintained over a relatively wide range of fluid flow rates.

In another feature of the present invention, a fluid flow partitioning means is fabricated by anisotropically etching a member such as a (110) silicon wafer to define a comb-shaped structure having a plurality of vane-like teeth or septa, carried from a common spine member for partitioning the flow stream into the plurality of ribbon-shaped flow stream portions.

In another feature of the present invention, the thermal fluid flow sensing elements are supported upon a web extending across the narrow dimension of the flow stream portions between adjacent septa of the flow divider.

In another feature of the present invention, a thermal loading member is disposed in heat-exchanging relation with the thermal fluid flow sensing elements whereby the flow regime wherein the temperature difference between the upstream and downstream fluid flow sensing elements is a direct function of flow rate is extended to substantially higher flow rates.

Other features and advantages of the present invention will become apparent upon a perusal of the following specification taken in connection with the accompanying drawings wherein:

BRIEF DESCRIPTION OF THE DRAWINGS

FIG. 1 is a perspective view of a thermal mass flow sensor incorporating features of the present invention, FIG. 2 is a plan view of the thermal mass flow sensing elements of the structure of FIG. 1, FIG. 3 is an enlarged detail view of a portion of the structure of FIG. 1 delineated by line 3—3, FIG. 4 is end view of an alternative embodiment of the mass flow sensor of the present invention, FIG. 5 is a view similar to that of FIG. 4 depicting an alternative embodiment of the present invention, FIG. 6 is an enlarged plan view of one thermal fluid flow sensing element disposed extending across a flow channel etched into the substrate member, FIG. 7 is an enlarged detail view of a portion of the structure of FIG. 4 delineated by 7—7, FIG. 8 is a view similar to that of FIG. 7 depicting an alternative embodiment of the present invention, and FIG. 9 is a plot of temperature differential $\Delta T$ between the upstream and downstream sensing resistive elements as a function of flow rate F and depicting the characteristics of the prior art and of the thermally loaded sensor of the present invention.

DESCRIPTION OF THE PREFERRED EMBODIMENTS

Referring now to FIGS. 1 and 2, there is shown a thermal mass flow sensor 11 incorporating features of the present invention. The mass flow sensor 11 includes a pair of semiconductors die or chip members 12 and 13 which have been anisotropically etched to provide a plurality of ribbonshaped flow channels 14 therein extending from the front side to the backside of each die member 12 and 13, respectively. The channels 14 are disposed in mutually opposed transverse registration so that the channel portions in each of the respective die 12 and 13 provides a respective half of the composite channel 14. Lower die 13 has a thermally insulative web 15 extending across its upper major face for supporting and carrying thereon an upstream and downstream temperature dependent resistors 16 and 17, respectively.

The temperature dependent resistors 16 and 17, as of nickel, meander back and forth in a serpentine pattern so as to each occupy substantially a one-third percentage of the area of the web 15. Bonding pads 18 are carried upon the upper face of the web 15 at the edge of the chip 13 for making electrical connections to the opposite ends of the resistors 16 and 17 and to a center tap node between the two resistors 16 and 17 via lead 19. The resistors 16 and 17 are typically connected into two halves of an electrical bridge for producing an output proportional to the temperature difference between the upstream and downstream resistors 16 and 17, respectively. In addition, a heating current is passed serially through the resistors 16 and 17. The upper chip 12 preferably has a notch 21 anisotropically etched therethrough in registration with the bonding pads 18 to facilitate making electrical connection to the pads 18.

In a preferred embodiment, the chips 12 and 13 are fabricated in wafer form. Thereafter the wafers are bonded together in mutually opposed relation and diced to provide the composite thermal flow mass sensor 11.

In a preferred embodiment, the channels 14 are anisotropically etched through a mask of silicon oxynitride on the (110) major face of the silicon wafer, said wafer having a thickness as of 100 to 200 mils. The longitudinal side edges of the channels 14 are aligned with the traces of the (111) crystallographic planes with the (110) plane. The anisotrpic etchant, such as KOH or ethylene diamine pyrocatecol (EDP) has a much faster etch rate for the (110) crystallographic planes than for the (111) planes. As a result, the channels 14 can be etched with a much higher aspect ratio, i.e., depth to width ratio. In a typical example, the channels 14, in each chip 12 or 13, have a width of 0.005" to 0.050" and a depth of from 0.050" to 0.500".

The anisotropically etched, closely spaced channels 14 define flow partitioning vanes 22 therebetween having a thickness of 0.005" to 0.0005". As a consequence, with a reasonably sized composite silicon die, i.e., 0.300" by 0.300" by 0.300"; the entire flow range from essentially zero flow to 20 liters per minute can be measured without the provision of a flow divider, i.e., the entire flow to be measured flows through channels 14 each including the thermal mass flow sensing elements 16 and 17. As a consequence, measurement errors due to the provision of a separate flow divider are eliminated, and furthermore, flow differences in the various channels are averaged by the provision of the thermal sensing elements 16 and 17 being common to all of the channels 14. The die 12 and 13 are bonded together by means of any suitable adhesive materials such as glass frit or epoxy resin. -

Referring now to FIG. 3, the web 15 and septa 22 are shown in enlarged scale. More particularly, the web 15 includes a support layer 23 of thermally insulative stress-free material such as a silicon oxynitride film having a thickness as of 5,000 Å to two microns. The temperature-dependent resistor material 16 or 17, as of nickel, permaloy or the like, is deposited to a suitable thickness as of 800 Å as by sputtering upon the layer 23 and then patterned to define the resistive elements 16 and 17, respectively, by conventional photolithography and etching techniques. Then, the patterned resistors are passivated with a third layer 24 of stress-free silicon oxynitride material, to a thickness substantially equal to the thickness of layer 23. These oxynitride layers are preferably deposited by plasma enhanced chemical vapor deposition at relatively low temperatures as of 380° C. utilizing a chemical vapor processing machine of the type disclosed in U.S. Pat. No. 4,223,048 issued Sept. 16, 1980. As an alternative to depositing a stress-frame silicon oxynitride layer, the layers 23 and 24 may be made up of alternate layers of silicon dioxide and silicon nitride proportioned such that the composite layered structure is stress-free. Silicon nitride layers, are particularly useful as an etch-stop layer when utilizing the anisotropic etchants of KOH or EDP.

Referring now to FIG. 6, there is shown one specific embodiment of a web structure 15 which is thermally decoupled from the supporting septa 22. In this embodiment, the side edges of the web are defined by lines paralleling the diagonals of parallelograms defined by the traces produced by the intersections of the (111) crystallographic planes with the (110) face of the silicon wafer or die 12 or 13. In addition, the web 15 is slotted with arrays of slots 26 and 27 also paralleling the diagonals of such parallelograms. The slots 26 and 27 are interrupted and arranged in sets of parallel lines with the interruption in one line of parallel slots being disposed in transverse registration with the central regions of slots in an adjacent parallel line of interrupted slots. In a typical example, the slots 26 and 27 have a width of 0.005" and a length of 0.002" to 0.010". The resistor 16 or 17 is meandered through the array of slots. One pattern for such meandering is shown in FIG. 6.

The side edgtes of the web 15, which are disposed adjacent the septa 22 need not be serrated, as shown in FIG. 6, but may extend over and be contiguous with the septs 22. In this case, the slot array 26 and 27 is merely continued over to the septs 22 such that the respective slots 26 and 27 terminate along a common (111) trace forming the sidewall of the septa 22. This embodiment, not shown, provides increased strength but has increased thermal loss to the septa 22.

The web 15 may comprise one integral member extending over the open ends of all of the flow channels 14 in the manner as shown in FIG. 2. As an alternative, the web 15 may be provided only under the respective resistors 16, 17 and lead 19 with openings or gaps provided in the web spaces between resistor 16 and lead 19 and lead 19 and resistor 17.

Referring now to FIGS. 4 and 7, there is shown an alternative embodiment to that of FIG. 1 with the exception that the lower chip member 13 is much thinner, i.e. 0.007" to 0.030". The major face of the chip 13 is recessed by anisotropically etching through the slots 26 and 27 as previously described with regard to FIG. 6. However, the depth of the recess 31 is much shallower than that of the channels 14. In addition, the recesses 31 need not be open on their ends to the flow of fluid through the channels 14, i.e., merely recessed wells or tubs. The depth of the recess 31 determines the amount of thermal loading presented to the sensing resistors 16 and 17. By decreasing the depth of the recess 31, the amount of thermal loading can be correspondingly increased.

The flow response characteristic for a thermal mass flow sensor incorporating an upstream and downstream sensing resistor heated by a heating current flowing therethrough and subjected to flow is as shown in FIG. 9 at curve 32. This response of temperature differential ΔT as a function of flow F is characterized by a low-flow regime wherein ΔT is a direct function of flow rate. The expression in the low-flow regime is as follows:

$$\Delta T = \frac{PFC_pK}{N} \qquad \text{Eq. (1)}$$

where P is the injected heating power, F the mass flow, $C_p$ the specific heat capacity of the gas, K is a system related constant and N is a correction factor which depends on the molecular structure of the gas. ΔT increases directly with flow until a critical point is reached indicated at 33 of FIG. 9 and thereafter the response becomes an exponential inverse function of flow rate in accordance with the following relation:

$$\Delta T = \frac{P}{FC_p} \qquad \text{Eq. (2)}$$

The critical point 33 corresponds to a condition where the loss of heat to the surrounds is approximately equal to the loss of heat to the flow. Accordingly, in the embodiment of FIG. 4, by making the spacing between the resistor 16 and 17 and the bottom of the recess 31 small, the thermal loading is increased thereby moving the critical point out to higher flow rates as indicated at 34 of FIG. 9. This will allow one electronic circuit to be utilized for measuring the flow in the low-flow regime over the entire flow range of interest.

In a typical example, the flow range of interest is from zero to 10 liters per minute. Thus, the embodiment of FIG. 4 allows measurement of the entire flow, i.e., there is no bypass, and also permits one kind of electronics to be utilized for measuring flow over the entire range of flow of interest. Furthermore, by blocking off the ends of the recesses 31, etching tubs, the spacing between the web 15 and the bottom of the recess 31 can be very small, minimizing the possibility of collecting debris in the space between the web 15 and the bottom of the recesses 31.

Referring now to FIG. 5, there is shown an alternative embodiment of the present invention. The embodiment of FIG. 5 is substantially the same as that of FIG. 4 with the exception that the lower chip 13 is from a (100) wafer, i.e., the major face of the wafer is the (100) plane. The web 15 is carried upon the major face of chip 13 over a recess 35 provided under the web 15, preferably by undercut anisotropic etching through slots in the web 15 similar to the array of slots 26 and 27 shown in FIG. 6 except that the slots 26 and 27 correspond to the diagnoals of parallelograms defined by the intersection of the (111) planes with the (100) plane at the major face of the wafer. In the embodiment of FIG. 5 the recess 35 may be open on the ends to provide a flow channel or may be closed on the ends to provide tubs underlying the web 15.

In both of the emboidments of FIGS. 4 and 5, the lower chip 13 may also be incorporated into a sandwich structure of the type shown in FIG. 1 where chip 13 serves as the dividing web 15 between parallel flow channels 14. In this embodiment, the flow channels 14 above and below the dividing chip 13 preferably have the same or nearly the same dimensions. In this latter embodiment, the chip 13 may be thinned after etching of the recesses 31 so as to reduce perturbation of the flow caused by the flow dividing chip 13. Also, chip 13 can be etched from both major faces to provide webs 15 facing into flow channels 14 in chip 12 on both sides.

Referring now to FIG. 8, there is shown an alternative embodiment of the present invention wherein the web 15, including the temperature dependent resistor 16 or 17, is carried from the end sof the septa 22 in one chip 13 or 12 and a thermal-loading member 37 such as an undercut silicon web 37 is carried as a web over the ends of the septa 22 in a separate wafer chip 12 or 13. In this embodiment, the spacing between the thermal loading member 37 and the web 15 can be determined by the thickness of a spacing element 38 or the like which can be made to have any desired thickness from a few microns to a mil or more.

The comb-shaped fluid flow partitioning structure 12 or 13 and 22 need not be fabricated by anisotropic etching of silicon or other diamond cubic material. As an alternative, it may be made by laminating together alternate sheets of dissimilar materials such as plastic and metal (acrylic and stainless steel) or aluminum and stainless steel and dissolving (anisotropically etching) one of the materials leaving the comb-shaped structure, such as by dissolving out the plastic or aluminum to leave the stainless steel comb-shaped structure. The spine of the comb would be made of an etchresistant material such as epoxy.

The advantages of the flow sensor 11 of the present invention include the ability to sense a substantial proportion of the flow directly eliminating, in some cases, the need for a bypass or if the bypass is utilized, the flow division ratio (total flow divided by flow through the directly measured channels) is relatively small on the order of two or three to one. Thus, the erros attirubtable to changes in the flow division ratio are not multiplied to large percentage error signals. Furthermore, by employing the thermal loading structure, of the present invention, the low-flow regime is pushed out to much higher flow rates, thus, permitting one kind of electronics to be utilized for sensing the flow to much higher flow rates.

What is claimed is:

1. In a method for thermal measurement of fluid flow the steps of:
    partitioning the fluid flow to be measured into a plurality of generally parallel elongated ribbon-shaped partitioned flow stream portions, each ribbon-shaped stream portion having in cross-section a broad dimension and a narrow dimension for providing rectified flow conditions over a relatively wide range of fluid flow rates; and
    disposing a thermal flow sensor across the said narrow dimensions of a plurality of said partitioned ribbon-shaped flow portions and in heat-exchanging relation predominantly with the narrow dimensions of a plurality of said ribbon-shaped flow stream portions for measuring the fluid flow.

2. The method of claim 1 wherein the step of partitioning the flow into a plurality of ribbon-shaped flow stream portions includes the step of:

anisotropically etching a member to define a comb-shaped structure having a plurality of vane-shaped septa each having major faces and carried from a common spine member, and disposing the comb-shaped structure in the flow stream for partitioning the flow stream into the plurality of ribbon-shaped flow stream portions flowing inbetween adjacent septa.

3. The method of claim 2 wherien the anisotropically etched member comprises a wafer of diamond cubic material having (110) major faces, with the major faces of the vane-shaped septa being defined by (111) planes of the diamond cubic wafer material.

4. The method of claim 2 wherein the step of disposing the thermal fluid flow sensor in heat-exchanging relation predominantly with the narrow face of at least one of the ribbon-shaped flow stream portions includes the step of supporting the thermal fluid flow sensor upon a web extending across the fluid flow stream portions flowing inbetween adjacent septa.

5. The method of claim 1 wherein the step of disposing the thermal fluid flow sensor in heat-exchanging relation predominantly with the narrow dimensions of a pluraliyt of said ribbon-shaped flow stream portions includes the steps of:
disposing first and second sensing resistors serially to the narrow dimensions of the partitioned flow stream portions with the first resistor being upstream of the second resistor;
deriving an electrical output signal from said first and second sensing resistors which is a function of the temperature difference between said sensing resistors produced by the flow of fluid in the fluid stream;
said derived output signal being characterized by a critical flow rate defined as the flow rate at which the amplitude of the temperature difference between said first and second sensing resistors changes from a direct function of flow rate to an inverse function of flow rate with increasing flow rate; and
thermally loading said first and second sensing resistors as arranged relative to said partitioned flow stream by increasing the loss of heat from said resistors to their surrounds exclusive of said flow stream portions so as to substantially increase the fluid flow rate corresponding to the critical flow rate, whereby the flow regime wherein the temperature difference between said first and second resistors is a direct function of flow rate is extended substantially to higher flow rates.

6. The method of claim 5 wherein the step of thermally loading said first and second sensing resistors includes the step of coupling a thermally conductive element in heat-exchanging relation with said first and second resistors.

7. In a method for making a fluid flow sensor, the steps of:
forming a layer of electrically and thermally insulative material on the major face of a substrate wafer;
forming a temperature dependent resistor on said layer of thermally insulative material;
selectively etching said substrate material from underneath said insulative layer so as to provide a web of said layer of thermally insulative material supported from an unetched portion of said substrate material;
partitioning the fluid flow to be measured into a pluraliyt of generally parallel, elongated ribbon-shaped flow stream portions, each stream portion having in cross-section a broad dimension and a narrow dimension for providing rectified flow conditions over a relatively wide range of fluid flow rates; and
disposing said temperature dependent resistor as supported upon said web of thermally insulative material in heat-exchanging relation predominantly with the narrow dimensions of a plurality of said ribbon-shaped flow stream portions for measuring the fluid flow.

8. The method of claim 7 wherein said temperature dependent resistor includes first and second resistor portions serially disposed relative to the narrow dimensions of the partitioned flow stream portions, with the first resistor portion being upstream of the second resistor portion.

9. The method of claim 8 including the steps of:
deriving an electrical output signal from said first and second resistor portions which is a function of the temperature difference between said resistor portions produced by the partitioned flow of fluid;
said derived output signal being characterized by a critical flow rate at which the amplitude of the temperature difference between said first and second sensing resistor portions changes from a direct function of flow rate to an inverse function of flow rate with increasing flow rate; and
thermally loading said first and second resistor portions as arranged relative to said partitioned flow stream by increasing the loss of heat from said resistor portions to their surrounds exclusive of said flow stream portions so as to substantially increase the critical flow rate, whereby the flow regime wherein the temperature difference between said first ands econd resistor portions is a direct function of flow rate is extended substantially to a higher flow rate.

10. The method of claim 9 wherien the step of thermally loading said first and second resistor portions includes the step of coupling a thermally conductive element in heat-exchanging relation with said first and second resistor portions.

11. In a thermal fluid flow apparatus:
partitioning means for partitioning the fluid flow to be measured into a plurality of generally parallel, elongated narrow ribbon-shaped partitioned flow stream portions, each stream portion having in cross-section a broad dimension and a narrow dimension for providing rectified flow conditions over a relatively wide range of fluid flow rates; and
thermal fluid flow sensor means disposed in heat-exchanging relation predominantly with the narrow dimensions of a plurality of said partitioned ribbon-shaped flow stream portions for measuring the fluid flow.

12. The apparatus of claim 11 wherein said partitioning means comprises a comb-shaped structure having a plurality of vane-shaped septa each having major faces and carried from a common spine member for partitioning the fluid flow stream into a plurality of ribbon-shaped flow stream portions flowing inbetween adjacent septa.

13. The apparatus of claim 12 wherein said comb-shaped structure is made of diamond cubic material the major faces of said septa being defined by (111) planes of the diamond cubic material.

14. The apparatus of claim 12 wherein said thermal fluid flow sensor means includes a web extending across the flow stream portions flowing inbetween adjacent septa; and temperature dependent resistor means carried from said web in heatexchaning relation with the flow of fluid between said septa.

15. The apparatus of claim 11 wherein said fluid flow sensor means includes first and second sensing resistors serially disposed to the narrow dimensions of the partitioned flow stream portions with the first resistor being upstream of the second resistor;

electrical circuit means for deriving an electrical output signal from said first and second sensing resistors which is a function of the temperature difference between said sensing resistors produced by the flow of fluid in the fluid stream;

said derived output signal being characterized by a critical flow rate defined by the flow rate at which the amplitude of the temperature difference between said first and second sensing resistors changes from a direct function of flow rate to an inverse function of flow rate with increasing flow rate; and thermal loading means for thermally loading said first and second sensing resistors as arranged relative to said partion flow stream and for increasing the loss of heat from said sensing resistors to their surrounds exclusive of said flow stream portions so as to substantially increase the fluid flow rate corresponding to the critical flow rate, whereby the flow regime wherein the temperature difference between said first and second resistors is a direct function of flow rate is extneded substantially to higher flow rates.

16. The apparatus of claim 15 wherein said thermal loading means comprises a thermall conductive element disposed in heat-exchanging relation with said first and second resistors.

* * * * *